US009535708B2

(12) United States Patent
Bettink et al.

(10) Patent No.: US 9,535,708 B2
(45) Date of Patent: Jan. 3, 2017

(54) RATE-CONTROLLING OF HEAT GENERATING DATA PROCESSING OPERATIONS

(71) Applicants: John H. W. Bettink, San Jose, CA (US); Doron Shoham, Shoham (IL); Shimon Listman, Tel Mond (IL)

(72) Inventors: John H. W. Bettink, San Jose, CA (US); Doron Shoham, Shoham (IL); Shimon Listman, Tel Mond (IL)

(73) Assignee: CISCO TECHNOLOGY INC., San Jose, CA (US)

( * ) Notice: Subject to any disclaimer, the term of this patent is extended or adjusted under 35 U.S.C. 154(b) by 680 days.

(21) Appl. No.: 13/725,997

(22) Filed: Dec. 21, 2012

(65) Prior Publication Data

US 2014/0181503 A1    Jun. 26, 2014

(51) Int. Cl.
 *G06F 9/44* (2006.01)
 *G06F 1/20* (2006.01)
 *H04L 12/64* (2006.01)
 *G06F 1/32* (2006.01)

(52) U.S. Cl.
 CPC ............. *G06F 9/44* (2013.01); *G06F 1/206* (2013.01); *G06F 1/3234* (2013.01); *H04L 12/6418* (2013.01)

(58) Field of Classification Search
 None
 See application file for complete search history.

(56) References Cited

U.S. PATENT DOCUMENTS

| 5,189,314 A  * | 2/1993 | Georgiou et al. ............. 327/114 |
| 6,226,726 B1 * | 5/2001 | Kermani et al. .............. 711/170 |
| 7,441,074 B1 * | 10/2008 | Panigrahy et al. ........... 711/108 |
| 7,464,278 B2 * | 12/2008 | Cohen et al. ................. 713/320 |
| 7,549,177 B2 * | 6/2009 | Diefenbaugh .......... G06F 1/206 713/310 |
| 7,574,321 B2 * | 8/2009 | Kernahan et al. ............ 702/179 |

(Continued)

OTHER PUBLICATIONS

Guedes et al., "Limiting the Power Consuption of Main Memory," ISCA'07, Jun. 9-13, 2007, San Diego, California, USA (twelve pages).

*Primary Examiner* — Kim Huynh
*Assistant Examiner* — Paul J Yen
(74) *Attorney, Agent, or Firm* — The Law Office of Kirk D. Williams

(57) ABSTRACT

In one embodiment, individual or groups of heat generating data processing operations are rate-controlled such that a component, a set of components, a board or line card, and/or an entire apparatus or any portion thereof stays within a corresponding heat budget. One or more heat price tags are associated with these data processing operations which are used to determine whether or not a corresponding data processing operation can be currently performed within one or more corresponding heat budgets. If so, the data procession operation proceeds. If not, the data processing operation is delayed. Examples of such data processing operations include, but are not limited to, data retrieval from memory, data storage in memory, lookup operations in memory, lookup operations in a binary or ternary content-addressable memory, regular expression processing, cryptographic processing, or data manipulation.

13 Claims, 7 Drawing Sheets

(56) References Cited

U.S. PATENT DOCUMENTS

| | | | |
|---|---|---|---|
| 2005/0216222 A1* | 9/2005 | Inoue | 702/136 |
| 2012/0016533 A1* | 1/2012 | Lim et al. | 700/300 |
| 2013/0139169 A1* | 5/2013 | Prabhakar | G06F 9/4893 718/104 |
| 2014/0095902 A1* | 4/2014 | Rorai | G06F 1/3278 713/320 |

* cited by examiner

RATE-CONTROLLING OF HEAT GENERATING DATA PROCESSING OPERATIONS

TECHNICAL FIELD

The present disclosure relates generally to pacing the rate of individual data processing operations, such as, but not limited to, in a packet switching system or computer.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

In forwarding packets, a packet switching device often uses binary and ternary content-addressable memories to perform lookup operations for determining how to process a packet. These parallel search operations on entries in a content-addressable memory generate significant amount of heat.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

I. Overview

Figure 1A:
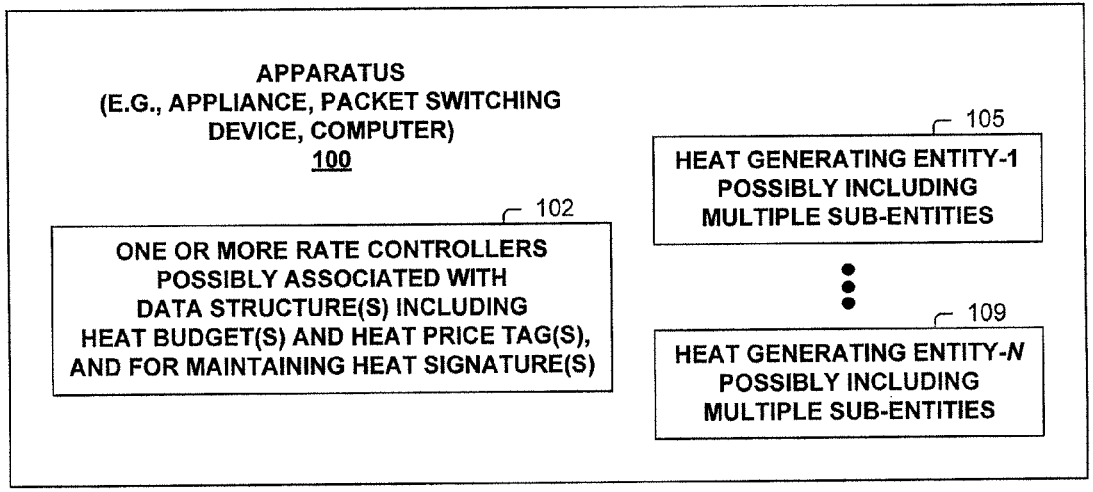
FIG. 1A illustrates an apparatus according to one embodiment.

Disclosed are, inter alia, methods, apparatus, computer-storage media, mechanisms, and means associated with rate-controlling of individual or multiple heat generating data processing operations.

One embodiment performs a method, which includes rate-controlling data processing operations performed by a particular apparatus to stay within a heat budget for performing said data processing operations based on one or more heat price tags associated with said data processing operations. In one embodiment, said data processing operations includes one or more of a group consisting of: data retrieval from memory, data storage in memory, lookup operations in memory, lookup operations in a binary or ternary content-addressable memory, regular expression processing, cryptographic processing, or data manipulation.

In one embodiment, the particular apparatus is an application-specific integrated circuit (ASIC) including a binary or ternary content-addressable memory configured for performing a plurality of content-addressable memory matching operations on content-addressable memory locations in parallel; and wherein said data processing operations include lookup operations in the binary or ternary content-addressable memory. In one embodiment, said one or more heat price tags associated with said data processing operations includes a heat price tag based on the number of content-addressable memory banks or entries to be fully or partially matched against by a particular lookup operation of said lookup operations. In one embodiment, said one or more heat price tags associated with said data processing operations includes a heat price tag based on the number of content-addressable memory banks or entries accessed by one or more read or write operations of said data processing operations.

One embodiment includes maintaining a token bucket based on said one or more heat price tags and the heat budget for performing said data processing operations by the particular apparatus; wherein said rate-controlling data processing operations is responsive to the token bucket. In one embodiment, the particular apparatus is a line card or board within a packet switching device or computer. In one embodiment, the particular apparatus is a processor, co-processor, application-specific integrated circuit (ASIC), or field-programmable gate array (FPGA).

In one embodiment, said rate-controlling data processing operations includes expediting the processing of one or more latency sensitive operations of said data processing operations over one or more other operations of said data processing operations in response to a current level of a heat signature maintained based on said heat price tags associated with said data processing operations relative to the heat budget. In one embodiment, said expediting occurs in response to when the current level of the heat signature is equal to or beyond a predetermined threshold relative amount of the heat budget.

In one embodiment, said rate-controlling data processing operations includes: determining a particular heat price tag for a particular operation of said data processing operations; and performing the particular operation in response to determining that currently there is room for the particular heat price tag to stay within the heat budget. In one embodiment, said rate-controlling data processing operations includes: determining a particular heat price tag for a particular operation of said data processing operations; and delaying performing the particular operation in response to determining that currently there is not room for the particular heat price tag to stay within the heat budget, and subsequently performing the particular operation in response to determining that currently there is room for the particular heat price tag to stay within the heat budget. In one embodiment, wherein said rate-controlling data processing operations includes limiting a maximum burst of performing said data processing operations based on said one or more heat price tags associated with said data processing operations.

One embodiment performs a method including rate-controlling data processing operations performed by a plurality of components of a particular apparatus to stay within one or more heat budgets for performing said particular data processing operations based on one or more heat price tags associated with said data processing operations. In one embodiment, a line card or board of a packet switching device or computer includes the plurality of components; wherein said one or more heat budgets includes a separate heat budget for each of the plurality of components; and wherein said rate-controlling data processing operations performed by the plurality of components of the particular apparatus to stay within one or more heat budgets includes rate-controlling said data processing operations to stay within each said separate heat budget. In one embodiment, said one or more heat budgets includes an overall heat budget for the line card or board; and wherein said rate-controlling data processing operations performed by the plurality of components of the particular apparatus to stay within one or more heat budgets includes rate-controlling said data processing operations to stay within the overall heat budget for the line card or board.

In one embodiment, a first heat price tag of said heat price tags associated with a particular data processing operation of said data processing operations on a first component of the plurality of components is different than a second heat price tag of said heat price tags associated with the particular data processing operation on a second component of the plurality of components. In one embodiment, the plurality of components including a cascade with the first component being before the second component; and wherein the second heat price tag includes an adjustment for heat generated by communication from the first component to the second component.

One embodiment includes an apparatus, comprising: one or more components, configured to perform data processing operations, which generate heat based on said data processing operations performed by said one or more components; and a rate controller configured to rate limit said data processing operations performed by said one or more components to manage said heat generated by said one or more components performing said data processing operations in order to stay within one or more corresponding heat budgets. In one embodiment, the apparatus is a line card or board of packet switching device or computer. In one embodiment, said one or more components includes one or more of a group consisting of: a processor, co-processor, application-specific integrated circuit (ASIC), or field-programmable gate array (FPGA). In one embodiment, said data processing operations includes one or more of a group consisting of data retrieval from memory, data storage in memory, lookup operations in memory, lookup operations in a binary or ternary content-addressable memory, regular expression processing, cryptographic processing, or data manipulation.

2. Description

Disclosed are, inter alia, methods, apparatus, computer-storage media, mechanisms, and means associated with rate-controlling of individual or multiple heat generating data processing operations. As used herein, a heat budget refers to an amount of heat (typically a maximum, or some percentage thereof such as in the case where a heat budget is allowed be exceeded for a short duration) that is used as a threshold value in rate controlling heat generating data processing operations. A heat price tag refers to an amount of heat to be attributed to a data processing operation (which may include a communication heat portion or be one of multiple values depending on which component(s) performs the data processing operation). A heat profile is a current heat level based on heat generating operations performed (which may also include a heat price tag amount from one or more heat generating operations to be performed).

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1A illustrates an apparatus 100 including one or more rate controllers 102 and one or more heat generating entities 105-109.

In one embodiment, a heat generating entity 105-109 is, or includes, a binary or ternary content-addressable memory processor, co-processor, application-specific integrated circuit (ASIC), or field-programmable gate array (FPGA). In one embodiment, a heat generating entity 105-109 is, or includes, a board or line card of a packet switching device, computer or other appliance.

One or more rate controllers 102 pace, schedule, or otherwise control the rate at which at least some data processing operations are performed by one or more heat generating entities 105-109, such as to stay within a heat budget for some corresponding entity including one or more of heat generating entities 105-109. In one embodiment, each of the one or more heat generating entities 105-109 has its own heat budget. In one embodiment, a board, card, and/or some set of one or more heat generating entities 105-109 has a heat budget for operations performed thereon (e.g., by one or more individual data processing components).

At least some data processing operations have associated therewith a heat price tag reflective of some measure of heat generated by their execution (which may include a heat price tag for transmission to the component which is going to perform the operation). In one embodiment, such data processing operations includes: memory or other device data retrieval or storage, lookup (e.g., search) operations in a binary or ternary content-addressable memory, regular expression processing, cryptographic processing, and/or manipulation of data. A heat price tag (e.g., itself or values for deriving it) is typically determined a priori and stored in a data structure for retrieval by one or more rate controllers 102.

Figure 1B:
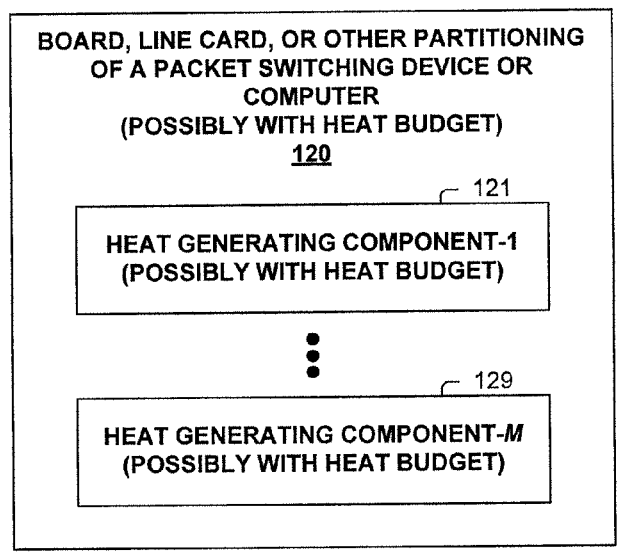
FIG. 1B illustrates an apparatus according to one embodiment.

FIG. 1B illustrates an entity, such as, but not limited to a board, line card, or other partitioning of a packet switching device or computer (or other appliance) 120. As shown, entity 120 includes one or more heat generation components 121-129. In one embodiment, each of one or more components 121-129 has its own heat budget for heat generating operations performed by it. In one embodiment, instead of, or in addition to, these individual component heat budgets, entity 120 has its own heat budget for the aggregation of the heat price tags of operations performed by one or more components 121-129. Therefore, in one embodiment, a heat profile of data operations by each of one or more components 121-129 is maintained within a corresponding heat budget, as well as an overall heat profile of data operations performed on entity 120.

Figure 1C:
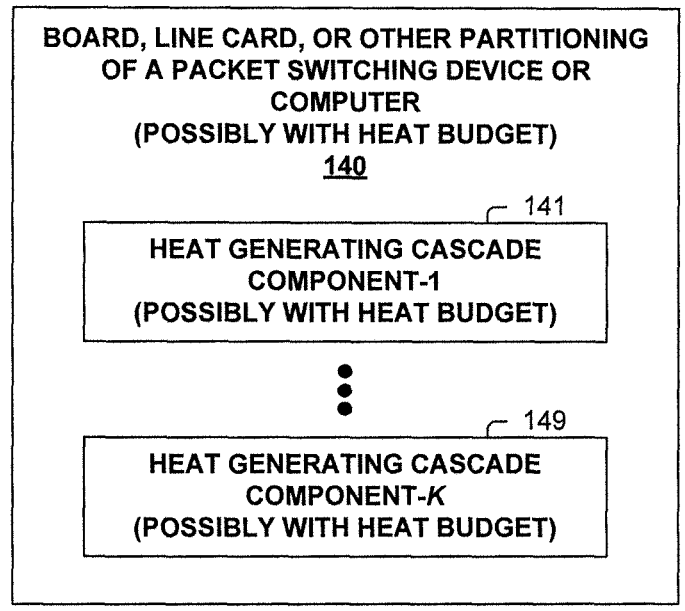
FIG. 1C illustrates an apparatus according to one embodiment.

FIG. 1C illustrates an entity, such as, but not limited to a board, line card, or other partitioning of a packet switching device or computer (or other appliance) 140. As shown, entity 140 includes multiple heat generation components 141-149 arranged in a cascaded manner. In one embodiment, each of components 141-149 has its own heat budget for heat generating operations performed by it. In one embodiment, instead of, or in addition to, these individual component heat budgets, entity 140 has its own heat budget for the aggregation of the heat price tags of operations performed by components 141-149.

In one embodiment, a heat price tag for a same data processing operation performed by a one cascaded component (141-149) is different than for a different cascaded component (141-149) such as to account for heat generated by communication through each stage of cascaded components 141-149.

Figure 1D:
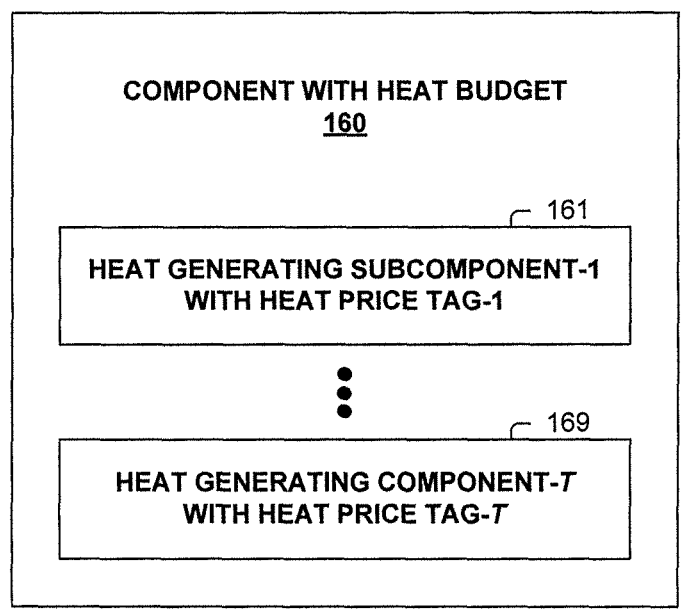
FIG. 1D illustrates an apparatus according to one embodiment.

FIG. 1D illustrates a component 160 (e.g., binary or ternary content-addressable memory, memory device, multi-core processor) that includes multiple heat generating sub-components 161-169 for which an individual heat price tag can be associated. Thus, for example, if a single sub-component (161-169) performs a data processing operation, then a first price tag is associated therewith. However, if multiple sub-components (161-169) perform the data processing operation, then a second price tag (presumably higher than the first price tag) is associated therewith.

Figure 2A:
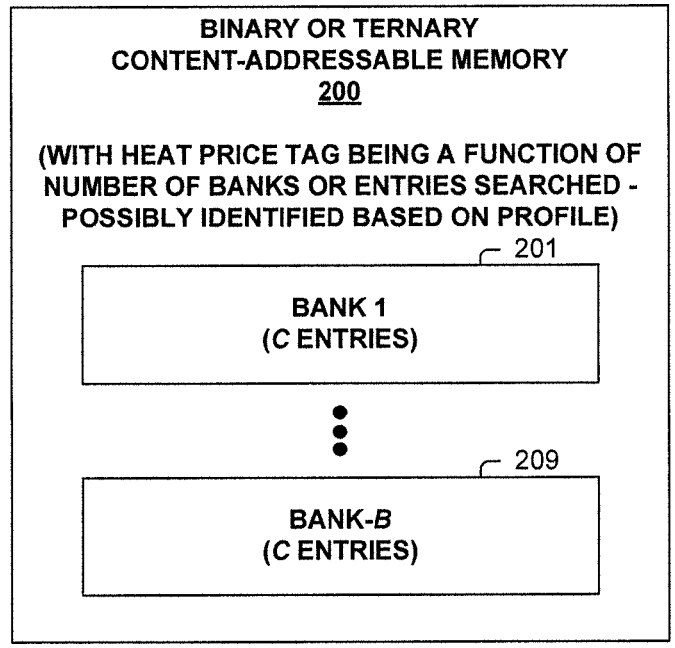
FIG. 2A illustrates an apparatus according to one embodiment.

For example, FIG. 2A illustrates a binary or ternary content-addressable memory 200 with multiple banks 201-209. In one embodiment, a lookup operation (e.g., a parallel search on multiple entries) in a single bank (201-209) has a heat price tag of p. A lookup operation on n banks (201-209) has a heat price tag of n*p (or some variant thereof). In one embodiment, the heat price tag is refined to the number of entries searched, rather than on a per bank basis. In one embodiment, heat price tag is refined to the number of entries fully matched and/or those partially matched.

In one embodiment, a lookup operation in binary or ternary content-addressable memory 200 is associated with a profile that defines the banks and/or number of entries to be searched. In such a case, the heat price tag of a lookup operation can be readily determined based on the profile of the lookup operation to be performed.

Figure 2B:
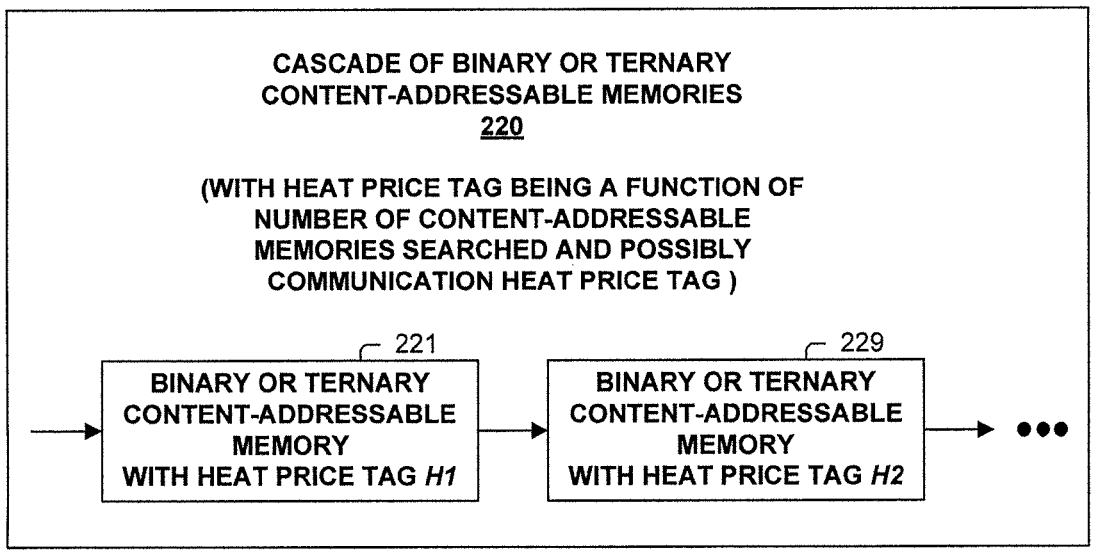
FIG. 2B illustrates an apparatus according to one embodiment.

FIG. 2B illustrates a cascade of binary and/or ternary content-addressable memories 220, including individual binary or ternary content-addressable memories 221-229. In one embodiment, the heat price tag of a lookup operation is proportional to the number of binary or ternary content-addressable memories 221-229 used for the particular lookup operation. In one embodiment, a same sized lookup operation performed on a binary or ternary content-addressable memory (221-229) in the cascade (220) has a lower heat price tag than that performed by a subsequent binary or ternary content-addressable memory (221-229) in the cascade (220) due to heat generated by the communication to the later stage.

Figure 3A:
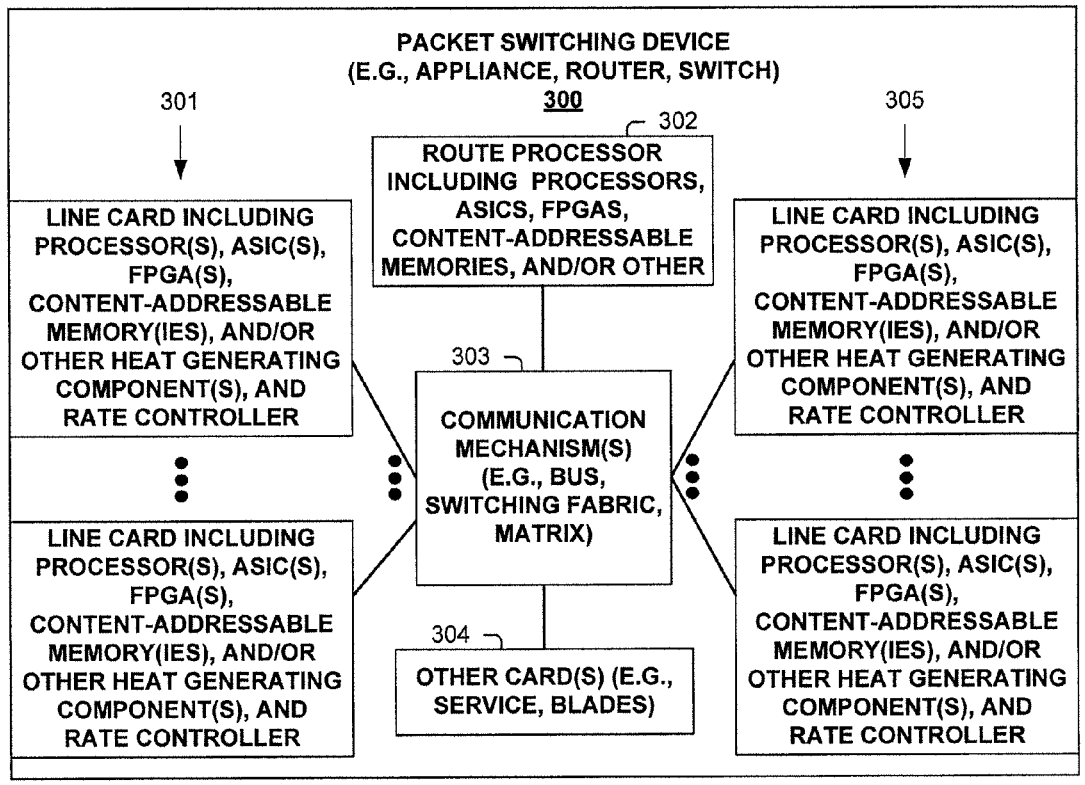
FIG. 3A illustrates a packet switching device according to one embodiment.

One embodiment of a packet switching device 300 rate-controlling individual or multiple heat generating data processing operations is illustrated in FIG. 3A. As shown, packet switching device 300 includes multiple line cards 301 and 305, each with one or more network interfaces for sending and receiving packets over communications links, and typically with one or more heat generating components and/or rate controller for pacing or scheduling heat generating data processing operations. Packet switching device 300 also has a control plane with one or more processing elements 302 for managing the control plane and/or control plane processing of packets associated with rate-controlling individual or multiple heat generating data processing operations. Packet switching device 300 also includes other cards 304 (e.g., service cards, blades) which include processing elements that are rate controlled and/or perform the rate controlling in one embodiment, and some communication mechanism 303 (e.g., bus, switching fabric, matrix) for allowing its different entities 301, 302, 304 and 305 to communicate.

Figure 3B:
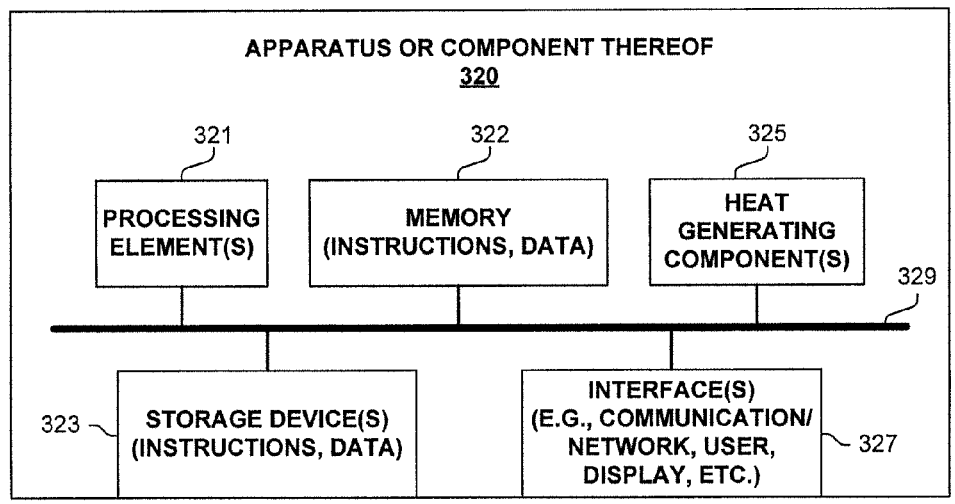
FIG. 3B illustrates an apparatus according to one embodiment.

FIG. 3B is a block diagram of an apparatus 320 used in one embodiment associated with rate-controlling of individual or multiple heat generating data processing operations. In one embodiment, apparatus 320 performs one or more processes (e.g., rate-controlling and/or is rate controlled), or portions thereof, corresponding to one of the flow diagrams illustrated or otherwise described herein, and/or illustrated in another diagram or otherwise described herein.

In one embodiment, apparatus 320 includes one or more processing element(s) 321, memory 322, storage device(s) 323, specialized (heat generating) component(s) 325 (e.g. optimized hardware such as for performing lookup and/or packet processing operations, etc.), and interface(s) 327 for communicating information (e.g., sending and receiving packets, user-interfaces, displaying information, etc.), which are typically communicatively coupled via one or more communications mechanisms 329, with the communications paths typically tailored to meet the needs of a particular application.

Various embodiments of apparatus 320 may include more or fewer elements. The operation of apparatus 320 is typically controlled by processing element(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processing element(s) 321 and/or data which is manipulated by processing element(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processing element(s) 321 and/or data which is manipulated by processing element(s) 321 for implementing functionality in accordance with an embodiment.

Figure 4:
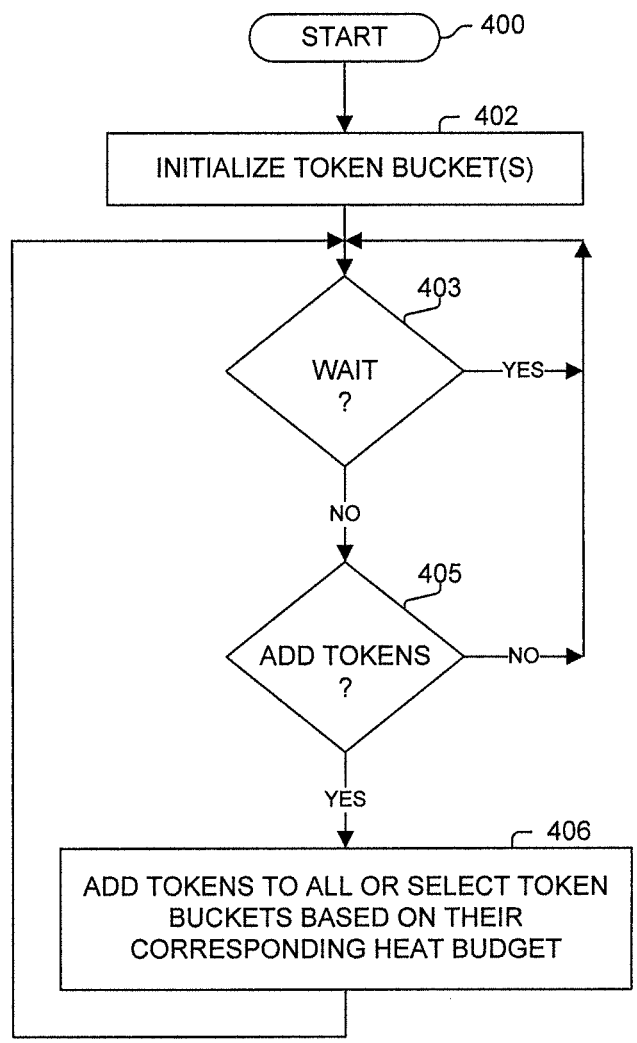
FIG. 4 illustrates a process according to one embodiment.
Figure 5A:
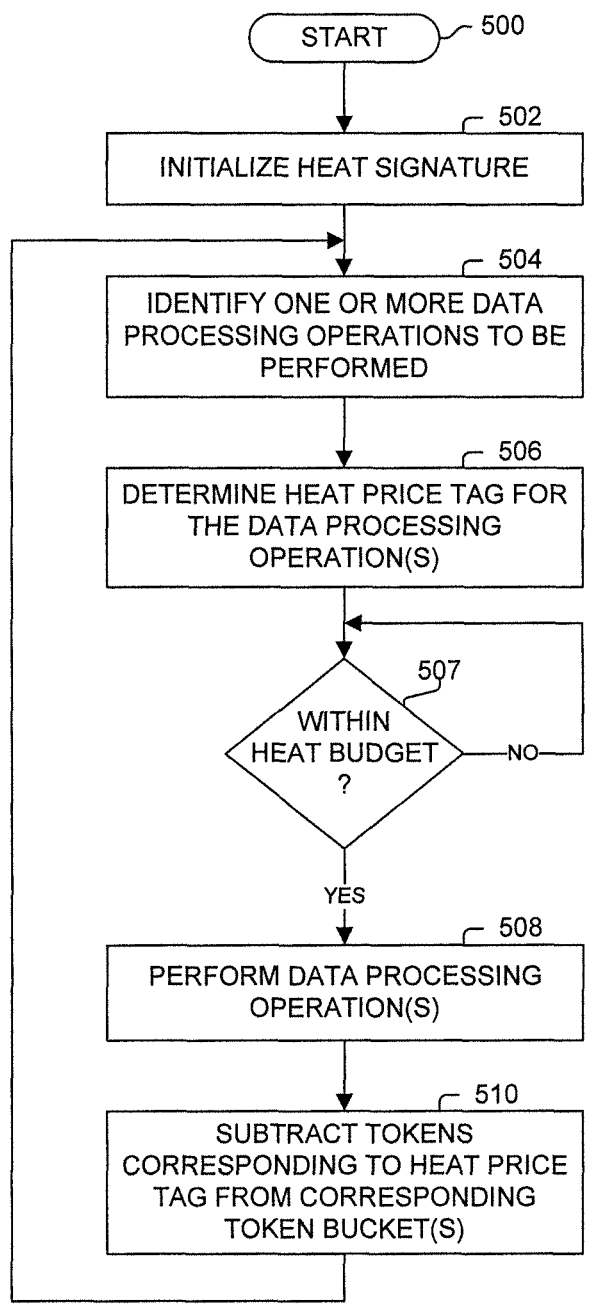
FIG. 5A illustrates a process according to one embodiment.

In one embodiment, rate controlling is performed using one or more token buckets, such as that illustrated in FIGS. 4, 5A and/or 5B. In one embodiment, this rate controlling is performed using another pacing and/or scheduling technique.

More specifically, FIG. 4 illustrates the adding of tokens to a token bucket at a rate commiserate with the heat dissipation rate of the corresponding heat generating component(s) or other entities. This information is typically a function of the cooling rate of the component per the system design, which may vary at runtime such as when certain cooling functions are running instead of in standby (e.g., a fan or water cooling currently operating). In one embodiment, the processing of FIG. 4 is performed for each token bucket used for rate controlling.

Processing of the flow diagram of FIG. 4 begins with process block 400. In process block 402, the token bucket(s) are initialized. Processing loops at process block 403 until it is time to add more tokens (e.g., allows the adding of tokens at a desired rate as rate is a function of time). As determined in process block 405, when token(s) should be added (e.g., the token bucket is not full such as for limiting burst performance of too many heat generating operations instead of the bucket to continuously increase), an appropriate number of tokens is added to all or select token buckets based on their corresponding heat budgets in process block 406. Processing returns to process block 403.

FIG. 5A illustrates a process used in one embodiment for rate controlling the processing of heat generating operations. Processing begins with process block 500. In process block 502, the heat signature (e.g., a current measure of a heat level of the corresponding entity being heat rate controlled) is initialized. In process block 504, one or more heat generating data processing operations to be performed are identified. In process block 506, a heat price tag is determined for these one or more data processing operations (e.g., typically based on one or more retrieved and/or calculated heat price tags).

In process block 507, a determination is made as to whether or not the heat budget(s) allow the data processing operation(s) to be performed. One embodiment makes this determination based on whether there are any tokens in the corresponding token bucket(s) (or there are tokens at least for a threshold value corresponding to the priority or latency requirement of the data processing operation(s)). One embodiment makes this determination based on whether there are at least the price tag number of tokens in the token bucket(s) (or at least the price tag number of tokens in the token bucket above a threshold number of tokens corresponding to the priority or latency requirement of the data processing operation(s)). In one embodiment, processing loops until there are enough tokens to process the operation (e.g., as tokens are added by the process illustrated in FIG. 4 thereby rate controlling/delaying these operation(s)). When the operation(s) can be performed while staying within the desired heat budget (e.g., there are sufficient tokens in one embodiment) as determined in process block 507, then the data processing operation(s) are performed in process block 508. In process block 510, the number of tokens in the token bucket(s) are adjusted based on a commiserate number of tokens corresponding to the heat price tag(s). In one embodiment, corresponding number(s) of tokens are subtracted from the token bucket(s). Processing returns to process block 504.

Figure 5B:
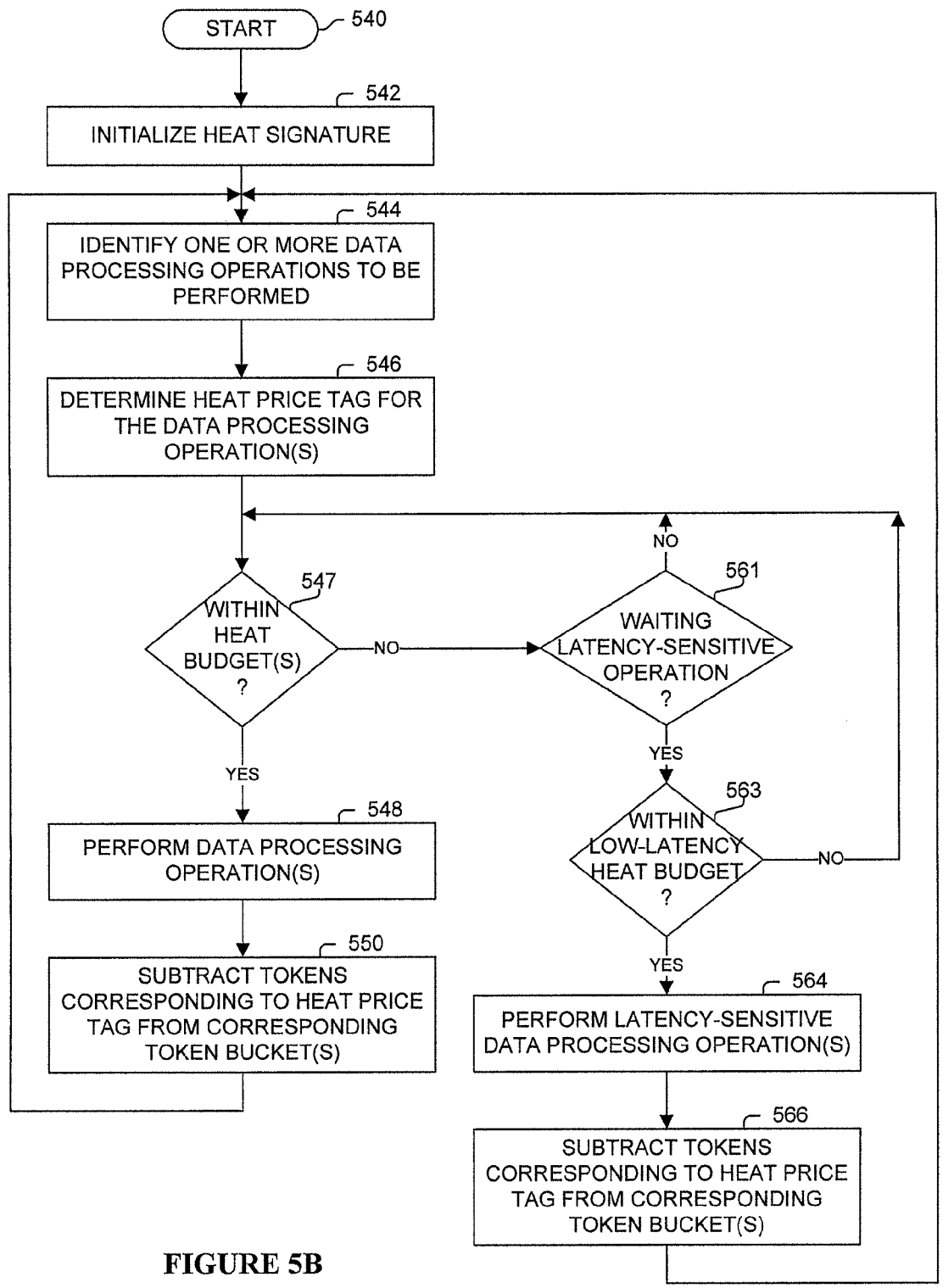
FIG. 5B illustrates a process according to one embodiment.

FIG. 5B illustrates a process used in one embodiment for rate controlling the processing of heat generating operations. Processing begins with process block 540. In process block 542, the heat signature (e.g., a current measure of a heat level of the corresponding entity being heat rate controlled) is initialized. In process block 544, one or more heat generating data processing operations to be performed are identified. In process block 546, a heat price tag is determined for these one or more data processing operations (e.g., typically based on one or more retrieved and/or calculated heat price tags).

In process block 547, a determination is made as to whether or not the heat budget(s) allow the data processing operation(s) to be performed. One embodiment makes this determination based on whether there are any tokens in the corresponding token bucket(s) (or there are tokens at least for a threshold value corresponding to the priority or latency requirement of the data processing operation(s)). One embodiment makes this determination based on whether there are at least the price tag number of tokens in the token bucket(s) (or at least the price tag number of tokens in the token bucket above a threshold number of tokens corresponding to the priority or latency requirement of the data processing operation(s)).

When it is determined in process block 547 that the operation(s) can be performed while staying within the desired heat budget (e.g., there are sufficient tokens in one embodiment), then the data processing operation(s) are performed in process block 548. In process block 550, the number of tokens in the token bucket(s) are adjusted based on a commiserate number of tokens corresponding to the heat price tag(s). In one embodiment, corresponding number(s) of tokens are subtracted from the token bucket(s). Processing returns to process block 544.

One embodiment requires a higher threshold number of tokens for a non-latency sensitive/low-priority one or more data processing operations so as not to allow the heat profile to reach or approximately reach the heat budget, so that if a low-latency/high-priority data processing operation is waiting to be performed as determined in process block 561, there may be a sufficient number of tokens to perform such processing of the low latency/high-priority data processing operation(s) (as determined in process block 563), while not enough tokens to process the non-low-latency/lower-priority data processing operation(s) (as determined in process block 547).

Thus, in one embodiment if there is not a sufficient number of tokens as determined in process block 547 such the operation(s) cannot be performed while staying within the desired heat budget (e.g., there are not sufficient tokens in one embodiment), then processing proceeds to check to see if a latency-sensitive/higher-priority one or more data processing operations are waiting in process block 561 and then to process block 563 to determine if these latency-sensitive/higher-priority one or more data processing operations can be performed while staying within their respective heat budget(s). In one embodiment, processing loops between process blocks 547, 561/563 until there are enough tokens to process at least one or more data processing operations (e.g., as tokens are added by the process illustrated in FIG. 4 thereby rate controlling/delaying these operation(s)).

When it is determined in process blocks 561 and 563 that the low-latency/high-priority data processing operation(s) can be performed while staying within the desired heat budget (e.g., there are sufficient tokens in one embodiment), then the data processing operation(s) are performed in process block 564. In process block 566, the number of tokens in the token bucket(s) are adjusted based on a commiserate number of tokens corresponding to the heat price tag(s). In one embodiment, corresponding number(s) of tokens are subtracted from the token bucket(s). Processing returns to process block 544.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    performing rate-controlling data processing operations by a particular apparatus to stay within a heat budget for performing said data processing operations based on one or more heat price tags associated with said data processing operations, wherein said performing rate-controlling data processing operations includes:
    determining, by the particular apparatus, to delay performing a particular next scheduled non-latency sensitive or low-priority operation of said data processing operations in response to a particular heat price tag associated with the particular next scheduled non-latency sensitive or low-priority operation that would not allow said data processing operations to stay within a predetermined additional heat budget margin below the heat budget if the particular next scheduled non-latency sensitive or low-priority operation is performed prior to a time delay, with said heat budget margin providing a heat margin such that a low-latency or high-priority operation of said data processing operations may be performed prior to a next scheduled non-latency sensitive or low-priority operation if performance of the low-latency or high-priority operation will allow said data processing operations to stay within the heat budget;
    in response to said determining to delay performing the particular next scheduled non-latency sensitive or low-priority operation, the particular apparatus performing a particular latency sensitive or high-priority operation of said data processing operations while staying within the heat budget; and
    subsequent to said performing the particular latency sensitive or high-priority operation of said data processing operations, performing the particular next scheduled non-latency sensitive or low-priority operation in response to the particular heat price tag associated with the particular next scheduled non-latency sensitive or low-priority operation allowing said data processing operations to stay within the predetermined additional heat budget margin below the heat budget.

2. The method of claim 1, wherein the particular apparatus is an application-specific integrated circuit (ASIC) including a binary or ternary content-addressable memory configured for performing a plurality of content-addressable memory matching operations on content-addressable memory locations in parallel; and
    wherein said data processing operations include lookup operations in the binary or ternary content-addressable memory.

3. The method of claim 2, wherein said one or more heat price tags associated with said data processing operations includes a heat price tag based on the number of content-addressable memory banks or entries to be fully or partially matched against by a particular lookup operation of said lookup operations.

4. The method of claim 2, wherein said one or more heat price tags associated with said data processing operations includes a heat price tag based on the number of content-addressable memory banks or entries accessed by one or more read or write operations of said data processing operations.

5. The method of claim 1, comprising: maintaining a token bucket based on said one or more heat price tags and the heat budget for performing said data processing operations by the particular apparatus;
    wherein said rate-controlling data processing operations is responsive to the token bucket.

6. The method of claim 1, wherein the particular apparatus is a line card or board within a packet switching device or computer.

7. The method of claim 1, wherein the particular apparatus is a processor, co-processor, application-specific integrated circuit (ASIC), or field-programmable gate array (FPGA).

8. The method of claim 5, wherein said rate-controlling data processing operations includes limiting a maximum burst of performing said data processing operations based on said one or more heat price tags associated with said data processing operations by limiting a maximum number of tokens in the token bucket.

9. The method of claim 1, wherein said data processing operations includes one or more of a group consisting of: data retrieval from memory, data storage in memory, lookup operations in memory, lookup operations in a binary or ternary content-addressable memory, regular expression processing, cryptographic processing, or data manipulation.

10. The method of claim 1, wherein said configuration to perform the latency sensitive operation includes configuration to perform said latency sensitive operation in response to determining that a heat price tag associated with the latency sensitive operation allows said data processing operations to stay within a low-latency heat budget.

11. The method of claim 1, wherein said performing the latency sensitive operation is performed in response to determining that a heat price tag associated with the latency sensitive operation allows said data processing operations to stay within a low-latency heat budget.

12. An apparatus, comprising:
one or more components, configured to perform data processing operations, which generate heat based on said data processing operations performed by said one or more components; and
a rate controller configured to rate limit said data processing operations performed by said one or more components to manage said heat generated by said one or more components performing said data processing operations in order to stay within a heat budget;
wherein said configuration of the rate controller to rate limit data processing operations includes configuration to:
determine to delay performing a particular next scheduled non-latency sensitive or low-priority operation of said data processing operations in response to a particular heat price tag associated with the particular next scheduled non-latency sensitive or low-priority operation that would not allow said data processing operations to stay within a predetermined additional heat budget margin below the heat budget if the particular next scheduled non-latency sensitive or low-priority operation is performed prior to a time delay, with said heat budget margin providing a heat margin such that a low-latency or high-priority operation of said data processing operations may be performed prior to a next scheduled non-latency sensitive or low-priority operation if performance of the low-latency or high-priority operation will allow said data processing operations to stay within the heat budget;
perform a particular latency sensitive or high-priority operation of said data processing operations while staying within the heat budget in response to said determining to delay performing the particular next scheduled non-latency sensitive or low-priority operation; and
perform, subsequent to said performing the particular latency sensitive or high-priority operation, the particular next scheduled non-latency sensitive or low-priority operation in response to the particular heat price tag associated with the particular next scheduled non-latency sensitive or low-priority operation allowing said data processing operations to stay within the predetermined additional heat budget margin below the heat budget.

13. The apparatus of claim 12, wherein the apparatus is a line card or board of packet switching device or computer;
wherein said one or more components includes one or more of a group consisting of: a processor, co-processor, application-specific integrated circuit (ASIC), or field-programmable gate array (FPGA); and
wherein said data processing operations includes one or more of a group consisting of: data retrieval from memory, data storage in memory, lookup operations in memory, lookup operations in a binary or ternary content-addressable memory, regular expression processing, cryptographic processing, or data manipulation.

* * * * *